United States Patent
Wilcox et al.

(10) Patent No.: US 11,885,358 B2
(45) Date of Patent: Jan. 30, 2024

(54) BLIND FASTENER AND METHOD OF INSTALLATION THEREOF

(71) Applicant: HOWMET AEROSPACE INC., Pittsburgh, PA (US)

(72) Inventors: Robert B. Wilcox, McGregor, TX (US); James Thomas Smith, Crawford, TX (US); Troy Don Pierce, Hewitt, TX (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 361 days.

(21) Appl. No.: 17/423,980

(22) PCT Filed: Feb. 7, 2019

(86) PCT No.: PCT/US2019/016973
§ 371 (c)(1),
(2) Date: Jul. 19, 2021

(87) PCT Pub. No.: WO2020/162936
PCT Pub. Date: Aug. 13, 2020

(65) Prior Publication Data
US 2022/0120306 A1  Apr. 21, 2022

(51) Int. Cl.
*F16B 19/10* (2006.01)
(52) U.S. Cl.
CPC .......... *F16B 19/1054* (2013.01); *F16B 19/10* (2013.01)
(58) Field of Classification Search
CPC .... F16B 5/04; F16B 7/14; F16B 19/10; F16B 19/1054; F16B 37/00; F16B 37/04
(Continued)

(56) References Cited

U.S. PATENT DOCUMENTS

| 4,203,346 A | 5/1980 | Hall et al. |
| 4,376,604 A * | 3/1983 | Pratt .................. F16B 19/1063 411/54 |

(Continued)

FOREIGN PATENT DOCUMENTS

| JP | 51-101469 U | 8/1976 |
| JP | 61-035214 U | 3/1986 |

(Continued)

OTHER PUBLICATIONS

International Search Report and Written Opinion for International Application No. PCT/US2019/016973 dated Nov. 7, 2019 10 pages.

*Primary Examiner* — Roberta S Delisle
(74) *Attorney, Agent, or Firm* — K&L Gates LLP

(57) ABSTRACT

The present disclosure relates to a blind fastener and a method of installation thereof. The blind fastener comprises a sleeve and a mandrel. The sleeve comprises a first sleeve end, a second sleeve end, and a cavity extending from the first sleeve end to the second sleeve end. The mandrel is configured to be at least partially received by the cavity of the sleeve. The mandrel comprises a first mandrel end disposed adjacent to the first sleeve end and comprising an enlarged portion having a diameter greater than a diameter of the cavity, a second mandrel end comprising a pull region, and a shank region extending intermediate the first mandrel end and the second mandrel end. The pull region comprises an axial length no greater than four times a diameter of the shank region and is configured to be engaged by an installation tool.

20 Claims, 4 Drawing Sheets

(58) Field of Classification Search
USPC .............................. 411/43, 44–45, 54, 60.1
See application file for complete search history.

(56) References Cited

U.S. PATENT DOCUMENTS

| | | | |
|---|---|---|---|
| 4,907,922 A | 3/1990 | Jeal et al. | |
| 2013/0177365 A1* | 7/2013 | Schneider | ........... F16B 19/1054 411/43 |
| 2014/0271024 A1* | 9/2014 | Jones | ................. F16B 19/1054 411/43 |
| 2017/0268556 A1* | 9/2017 | Koontz | ............... F16B 19/1054 |
| 2018/0207711 A1* | 7/2018 | Wang | .................... F16B 19/086 |

FOREIGN PATENT DOCUMENTS

| | | |
|---|---|---|
| JP | 03-060608 U | 6/1991 |
| JP | 2014-029210 A | 2/2014 |
| KR | 10-2005-0037765 A | 4/2005 |
| WO | 2004/102016 A1 | 11/2004 |
| WO | 2015/033330 A1 | 3/2015 |
| WO | 2016/028489 A1 | 2/2016 |

* cited by examiner

BLIND FASTENER AND METHOD OF INSTALLATION THEREOF

FIELD OF USE

The present disclosure relates to blind fasteners and methods of installing blind fasteners.

BACKGROUND

Vehicle frames, storage racks, solar panel sub-structures, and other structures can include numerous mechanical fasteners. For example, a fastener can be installed in a bore of a vehicle frame structural component to join individual elements. Failure of a fastener in a structural component can be a result of, for example, fatigue stresses on the fastener or geometric variations in the bore in which the fastener is disposed. Designing a fastener for blind installation presents challenges.

SUMMARY

In one aspect, the present disclosure provides a blind fastener comprising a sleeve and a mandrel. The sleeve comprises a first sleeve end, a second sleeve end, and a cavity extending from the first sleeve end to the second sleeve end. The mandrel is configured to be at least partially received by the cavity of the sleeve. The mandrel comprises a first mandrel end disposed adjacent to the first sleeve end and comprising an enlarged portion having a diameter greater than a diameter of the cavity, a second mandrel end comprising a pull region, and a shank region extending intermediate the first mandrel end and the second mandrel end. The pull region comprises an axial length no greater than 4 times a diameter of the shank region and is configured to be engaged by an installation tool.

In another aspect, the present disclosure provides a method for fastening. The method comprises inserting a first mandrel end of a blind fastener into a bore in a structure. The blind fastener comprises a sleeve and a mandrel. The sleeve comprises a first sleeve end, a second sleeve end, and a cavity extending from the first sleeve end to the second sleeve end. The mandrel is configured to be at least partially received by the cavity of the sleeve. The mandrel comprises a first mandrel end disposed adjacent to the first sleeve end and comprising an enlarged portion having a diameter greater than a diameter of the cavity, a second mandrel end comprising a pull region, and a shank region extending intermediate the first mandrel end and the second mandrel end. The pull region comprises an axial length no greater than 4 times a diameter of the shank region and is configured to be engaged by an installation tool. A collet of the installation tool is engaged with the pull region of the blind fastener. After inserting the blind fastener into the bore in the structure, the second sleeve end of the blind fastener is forcibly contacted with an anvil of the installation tool, and the pull region is moved distal from the second sleeve end utilizing the collet of the installation tool. The portion of the sleeve on a first side of the structure is deformed, and the second sleeve end is swaged onto the shank region of the mandrel on an oppositely disposed second side of the structure, thereby securing at least a portion of the blind fastener in the structure.

It is understood that the invention disclosed and described in this specification is not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Figure 1:
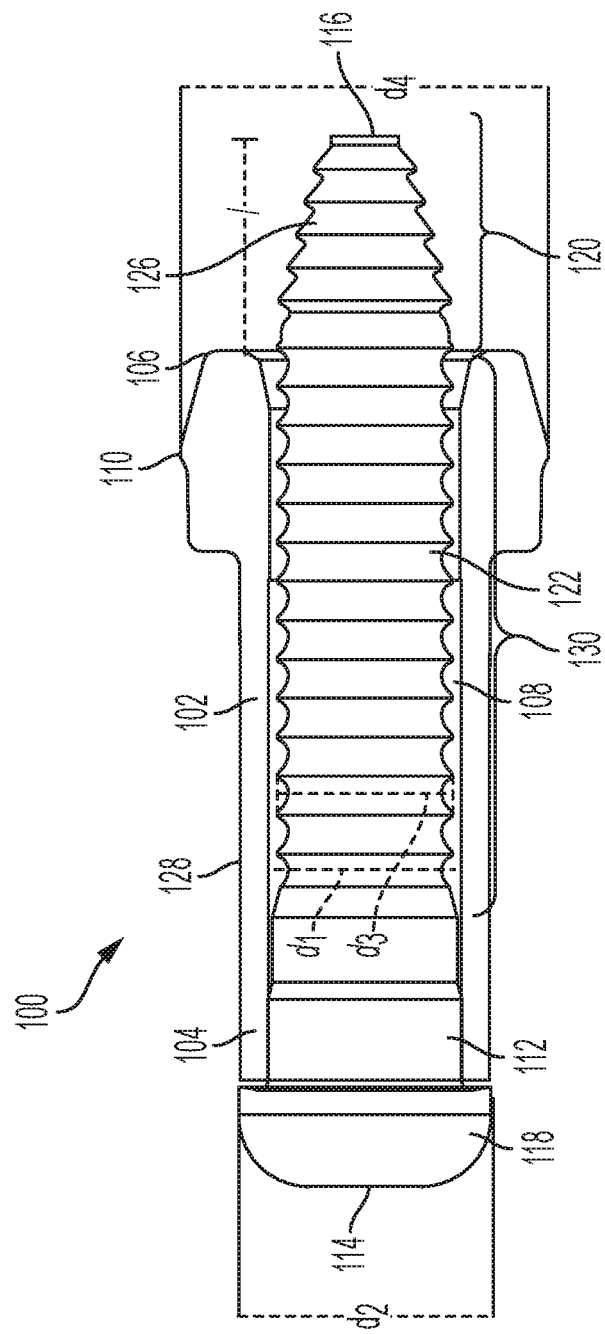
FIG. 1 is a partial cross-sectional side view of a non-limiting embodiment of a blind fastener according to the present disclosure.

Various examples are described and illustrated herein to provide an overall understanding of the structure, function, and use of the disclosed articles and methods. The various examples described and illustrated herein are non-limiting and non-exhaustive. Thus, an invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments," "some embodiments," "one embodiment," "an embodiment," or like phrases mean that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

Failure of a fastener in a structural component can be a result of in-service fatigue, overload on the structural component, and corrosion. The present disclosure provides a blind fastener and a method of installation that can reduce installation forces and increase corrosion resistance. For example, the blind fastener according to the present disclosure may be installed with an installation force less than a force that can fracture the mandrel. Reducing the installation force requirement and installing without a shock force occurring during fracture of the mandrel can enable lighter weight installation tools, longer life of installation tool components, limit damage to the structural components, and enhance ergonomics for operators using the installation tools.

Figure 2A:
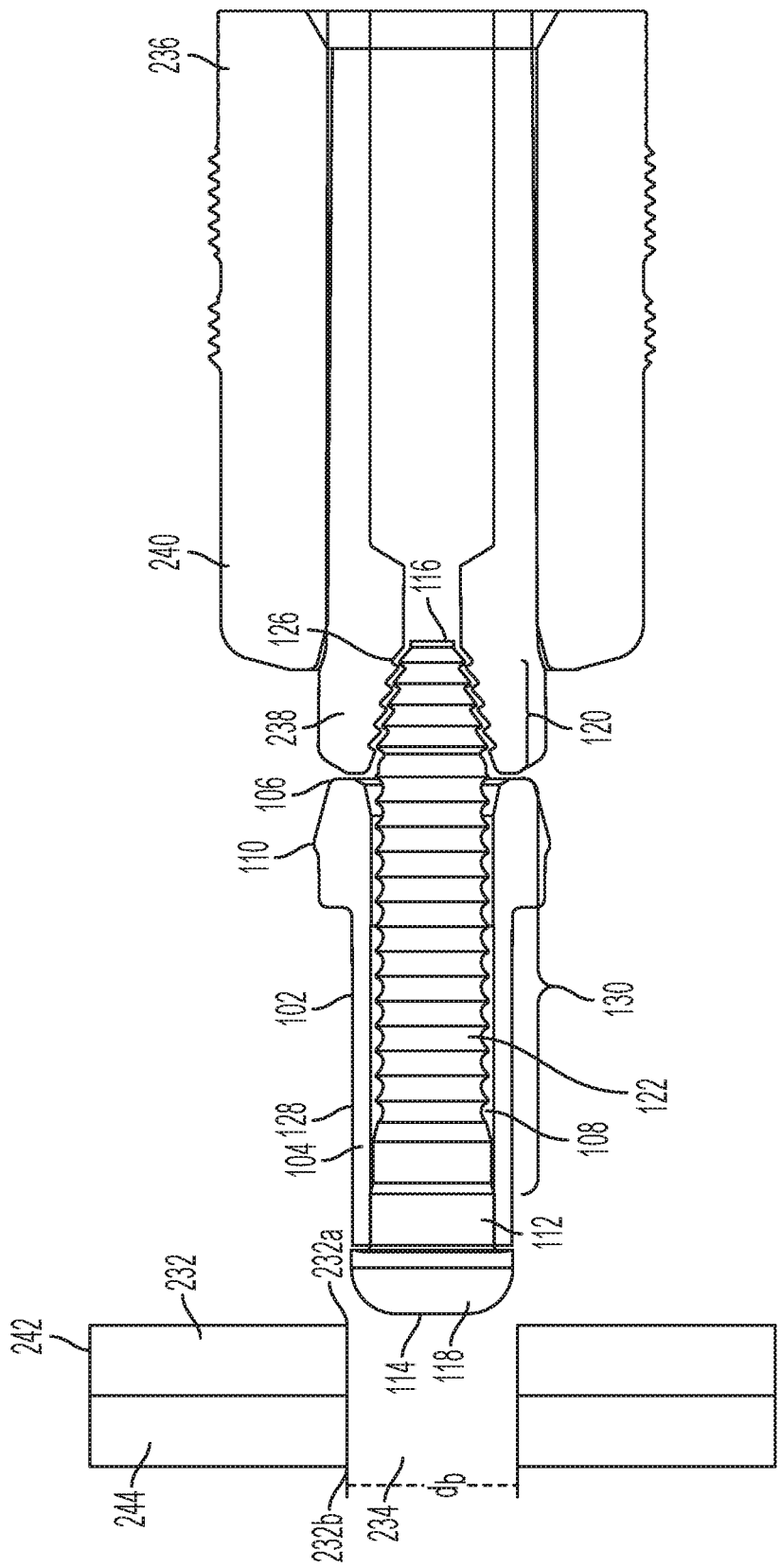
FIG. 2A is a partial cross-sectional side view of the fastener of FIG. 1 and a structure in a first configuration.
Figure 2B:
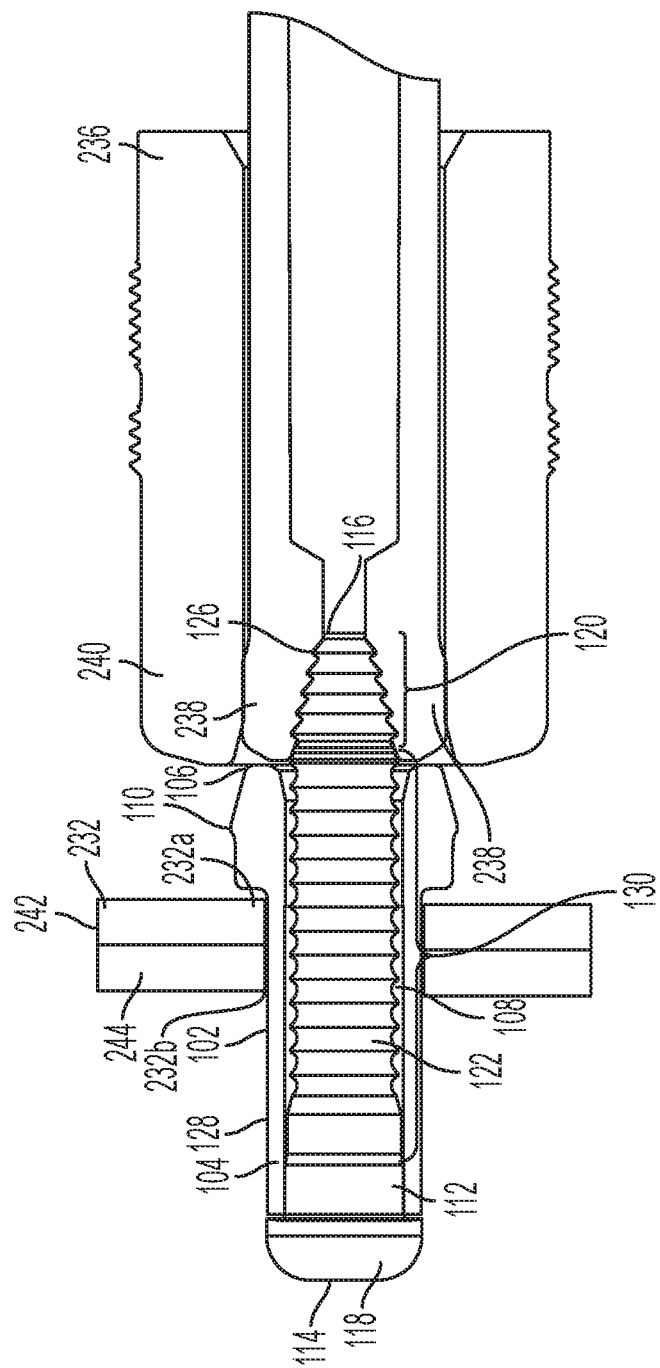
FIG. 2B is a partial cross-sectional side view of the fastener and the structure of FIG. 2A in a second configuration.
Figure 2C:
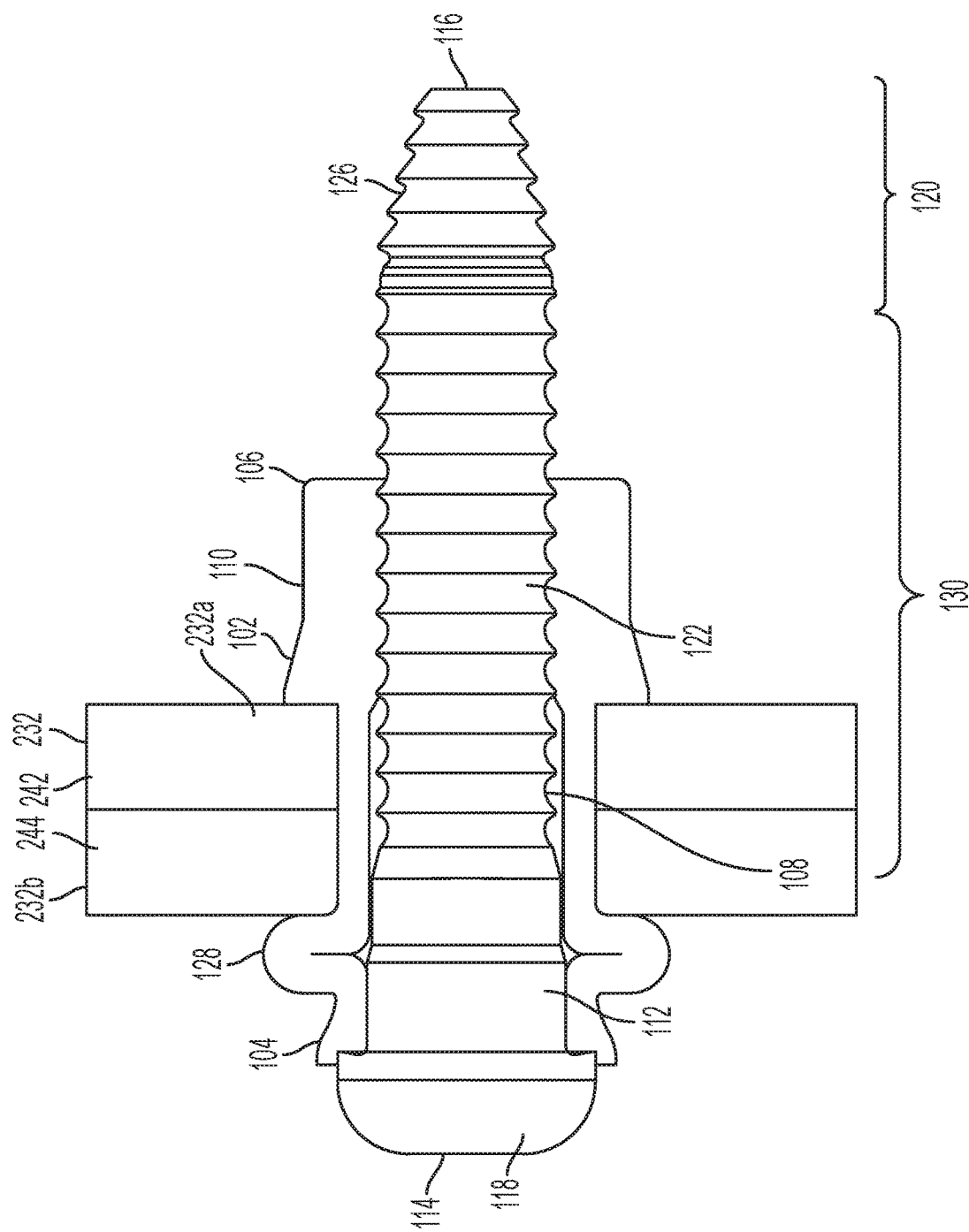
FIG. 2C is a partial cross-sectional side view of the fastener and the structure of FIG. 2A in a third configuration.

FIG. 1 illustrates a cross-sectional side view of an embodiment of a blind fastener 100 according to the present disclosure. The blind fastener 100 can be adapted to be installed in a bore in a structure (e.g., as illustrated in FIGS. 2A-C, discussed below). The blind fastener 100 can include a sleeve 102 and a mandrel 112. In various embodiments, the sleeve 102 is generally cylindrical. FIG. 1 shows a portion of the sleeve removed, exposing the mandrel 112 therein. The sleeve 102 can comprise a first sleeve end 104, a second sleeve end 106, an elongate portion 128 disposed intermediate the first sleeve end 104 and the second sleeve end 106, and a cavity 108 extending from the first sleeve end 104 to the second sleeve end 106.

The cavity 108 of the sleeve 102 can comprise a diameter, $d_1$, and be configured to at least partially receive the mandrel 112 therein. For example, the mandrel 112 can comprise a 112 shape suitable to be received by the cavity 108, such as, for example, a generally cylindrical shape. The mandrel 112 can comprise a first mandrel end 114, a second mandrel end 116, and a shank region 122. The shank region 122 can extend intermediate the first mandrel end 114 and the second mandrel end 116 and through the cavity 108. When the mandrel 112 is inserted in the cavity 108, the first mandrel end 114 can be disposed adjacent to the first sleeve end 104, and the second mandrel end 116 can be disposed adjacent to the second sleeve end 106.

The first mandrel end 114 can comprise an enlarged portion 118 comprising a diameter, $d_2$, which can be greater than the diameter, $d_1$, of the cavity 108. The enlarged portion 118 can engage the first sleeve end 104 of the cavity 108 and inhibit further movement of the first mandrel end 114 into the cavity 108 of the sleeve 102. The enlarged portion 118 can apply a force to the first sleeve end 104 and can deform the first sleeve end 104 during installation of the blind fastener 100. For example, the first sleeve end 104 can be crumpled (e.g., into a bulb shape) and/or expanded.

The second mandrel end 116 can comprise a pull region 120 configured to be engaged by an installation tool (e.g., installation tool 236, as illustrated in FIGS. 2A-B discussed below). The pull region 120 can comprise an axial length, l, that is no greater than 4 times a diameter, $d_3$, of the shank region 122, such as, for example, no greater than 3.8 times, no greater than 3.75 times, no greater than 3.5 times, no greater than 3.25 times, no greater than 3 times, no greater than 2.5 times, no greater than 2 times, no greater than 1.5 times, or no greater than 1 times the diameter, $d_3$, of the shank region 122. The diameter, $d_3$, of the shank region 122 can be the major diameter (e.g., root) of the shank region 122.

The pull region 120 can comprise a taper or a reverse taper. As illustrated, the pull region 120 can comprise a taper extending from the shank region 122. For example, as one moves along the pull region 120 away from the shank region 122 along a longitudinal axis of the blind fastener 100, the diameter of the pull region 120 can decrease. In certain other embodiments, the pull region 120 can comprise a reverse taper (not shown) where, as one moves along the pull region 120 away from the shank region 122 along the longitudinal axis of the blind fastener 100, the diameter of the pull region 120 increases. In various embodiments, the pull region 120 can be generally conical. In various other embodiments, the pull region 120 may not comprise a taper and the pull region 120 can be generally cylindrical.

The pull region 120 can comprise at least one of a generally smooth region, an annular shoulder, a groove, and a bore, or can comprise another feature, configured to be engaged by an installation tool. For example, the pull region 120 can comprise grooves 126, as illustrated in FIG. 1, that can be engaged by an installation tool.

The shank region 122 can define the longitudinal axis of the blind fastener 100. The shank region 122 can comprise at least one of a generally smooth region, a threaded region, an annular shoulder, and a groove. The threaded region, annular shoulder, and/or the groove can be external relative to the mandrel 112. In various embodiments, all or a portion of the shank region 122 includes grooves. For example, as shown in FIG. 1, the shank region 122 of the blind fastener 100 includes grooves 130. In other embodiments, all or a portion of the shank region 122 lacks grooves. In various embodiments, all or a portion of the shank region 122 includes an annular shoulder. In other embodiments, the shank region 122 lacks an annular shoulder. In various embodiments, all or a portion of the shank region 122 includes a threaded portion. In other embodiments, the shank region 122 lacks a threaded portion.

In various embodiments of blind fastener 100, the mandrel 112 does not comprise a breakneck groove or other feature configured to fracture upon installation of the blind fastener 100. For example, the shank region 122 may not comprise a breakneck groove or other feature configured to fracture upon installation of the blind fastener 100. The mandrel 112 may remain intact after installing the blind fastener 100 into a structure. In various embodiments, the blind fastener 100 may comprise a breakneck groove or other feature configured to fracture upon installation of the blind fastener 100, and the blind fastener 100 may be installed into a structure without fracturing of the breakneck groove or other feature.

In various embodiments, the blind fastener 100 can comprise a single assembly of the sleeve 102 and the mandrel 112. In certain embodiments, the blind fastener 100 can consist of the sleeve 102 and the mandrel 112. In some embodiments, the blind fastener 100 can be a structural blind fastener, such as, for example, a structural blind rivet, structural blind bolt, or a structural blind stud.

The blind fastener 100 can comprise at least one of a metal, a metal alloy, and a composite material. For example, in various embodiments the blind fastener 100 can comprise at least one of aluminum, an aluminum alloy, titanium, a titanium alloy, nickel, a nickel alloy, iron, an iron alloy, and a carbon fiber composite material. In various embodiments, the mandrel 112 can comprise a Rockwell hardness of at least HRC 25, such as, for example, at least HRC 30, at least HRC 35, at least HRC 40, at least HRC 43, at least HRC 44, at least HRC 45, or at least HRC 50.

The sleeve 102 can comprise a collar 110 positioned adjacent to the second sleeve end 106. The collar 110 can be configured to be engaged by an installation tool (e.g., installation tool 236 illustrated in FIGS. 2A-B) in order to facilitate installation of the blind fastener 100. The sleeve 102 can be configured to deform on the exit side of the structure and swage onto the shank region 122 an oppositely disposed entrance side of a structure. For example, the first sleeve end 104 can be deformed and the collar 110 can be swaged onto the shank portion 122, as illustrated in FIG. 2C. In various embodiments, the collar 110 can be a head portion of the sleeve 102.

As illustrated in FIGS. 2A-C, the blind fastener 100 can be installed into a bore 234 in a structure 232. The bore 234 can extend through the structure 232. The structure 232 can comprise, for example, at least one of a metal, a metal alloy, and a composite. For example, in certain embodiments, the structure 232 can comprise at least one of aluminum, an aluminum alloy, titanium, a titanium alloy, nickel, a nickel alloy, iron, an iron alloy, and a carbon fiber composite material.

In various embodiments, the structure into which the blind fastener 100 is assembled comprises aluminum and/or an aluminum alloy such as, for example, 7075 aluminum. With reference to the accompanying figures, the structure 232 can be configured as at least one of an aerospace component or structure, an automotive component or structure, a transportation component or structure, and a building and construction component or structure. The structure 232 can comprise a single layer of material or at least two layers of material. For example, as illustrated in FIGS. 2A-C, the structure 232 can comprise a first layer 242 and a second layer 244. Upon installation into the bore 234, the blind fastener 100 can secure the first layer 242 and the second layer 244 together, as illustrated in FIG. 2C.

As illustrated in FIG. 2A, in a first configuration of the blind fastener 100 and the structure 232, the first mandrel end 114 of the blind fastener 100 can be positioned in alignment with the bore 234. To facilitate alignment of the blind fastener 100 with the bore 234, the bore 234 can have a diameter, $d_b$, that is greater than the diameter, $d_2$, of the enlarged portion 118 of the first mandrel end 114, thereby allowing the mandrel 112 to readily move into and through the bore 234 when passing from a first configuration of the blind fastener 100 and the structure 232, illustrated in FIG. 2A, to a second configuration, illustrated in FIG. 2B. In various embodiments, the diameter, $d_b$, of the bore 234 can be less than the diameter of the sleeve 102 to allow the sleeve to readily pass into the bore 234. The diameter, $d_4$, of the collar can be greater than the diameter, $d_b$, of the bore 234. In the second configuration, shown in FIG. 2B, the first mandrel end 114 has passed into the bore 234 and the collar 110 of the sleeve 102 can be in forcible contact with the structure 232 at an entrance side 232a of the structure 232. The forcible contact between the collar 110 and the structure 232 can limit further axial movement of the sleeve 102 into the bore 234.

Before or after insertion, a collet 238 of the installation tool 236 can engage the pull region 120 of the blind fastener 100. For example, the collet 238 can be configured to forcibly contact an anvil 240 of the installation tool 236. The forcible contact can close the collet 238 around the pull region 120 where the collet 238 forcibly contacts the pull region 120. Upon engagement, the collet 238 can apply a force to the pull region 120 of the mandrel 112.

The collet 238 can move the mandrel 112 independently of the sleeve 102. For example, the collet 238 can retract within the installation tool 236 and move the mandrel 112 as the collet 238 retracts due to the contact between the pull region 120 and the collet 238. Upon the collet 238 reaching a predetermined retraction distance into the installation tool, the anvil 240 can forcibly contact the second sleeve end 106. The forcible contact between the second sleeve end 106 and the anvil 240 can move the second mandrel end 116 in a vector different than a vector in which the second sleeve end 106 may be moving. For example, the installation tool 236 can move the pull region 120 distal from the collar 110 utilizing the collet 238 of the installation tool 236.

In various embodiments wherein a pull region 120 of the mandrel 112 comprises grooves and a taper, the collet 238 of the installation tool 236 may only be able to apply force to the pull region 120 to move the mandrel 112 if the collet 238 and the grooves 126 of the pull region 120 are fully engaged, such as is illustrated in FIG. 2B. A partially engaged collet 238 may not be able to apply a force to the pull region 120 sufficiently to appropriately move the mandrel 112 relative to the sleeve 102. The grooves and taper of the pull region 120 can reduce potential stripping of the grooves 126 due to crest-to-crest engagement.

In a third configuration of the blind fastener 100 and the structure 232 illustrated in FIG. 2C, the first sleeve end 104 and the elongate portion 128 can be deformed on an exit side 232b of the structure 232 responsive to forcible contact from mandrel 112. The second sleeve end 106 can be swaged onto the shank region 122 on an oppositely disposed entrance side 232a of the structure 232 responsive to forcible contact from the anvil 240. For example, the collar 110 can be swaged onto the shank region 122. The swaging of the second sleeve end 106 and/or deformation of the first sleeve end 104 and/or elongate portion 128 can secure at least a portion of the blind fastener 100 in the structure 232. In that way, for example, the first layer 242 and second layer 244 of the structure 232 are secured together. As shown in the embodiments illustrated in FIGS. 2A-C, the mandrel 112 need not include a breakneck groove or other feature configured to fracture upon installation of the blind fastener 100.

In various embodiments, the blind fastener 100 can be used in a method for fastening the structure 232. The method can comprise inserting the first mandrel end 114 into the bore 234 in the structure 232. The collet 238 of the installation tool 236 can engage with the pull region 120 of the blind fastener 100. After inserting the blind fastener 100 into the bore 234, the second sleeve end 106 of the blind fastener 100 can contact the anvil 240 of the installation tool 236. The pull region 120 can be moved distal from the collar 110 utilizing the collet 238 of the installation tool 236. The first sleeve end 104 can be deformed on the exit side 232*b* of the structure 232, and the second sleeve end 106 can be swaged onto the shank region 122 of the mandrel 112 on the opposite, entrance side 232*a* of the structure 232, thereby securing at least a portion of the blind fastener 100 in the structure 232.

The blind fastener according to the present disclosure can enable use of a smaller installation tool for installation since the force required to install the blind fastener may be less than a force that can fracture the mandrel. The blind fastener according to the present disclosure can have a variety of uses since the design of the sleeve may not have to accommodate the force required to fracture the mandrel. For example, the sleeve wall thickness can be reduced by, for example, 10% or 15%, which can save material cost.

Various aspects of the invention include, but are not limited to, the aspects listed in the following numbered clauses.

1. A blind fastener comprising: a sleeve comprising a first sleeve end, a second sleeve end, and a cavity extending from the first sleeve end to the second sleeve end; and a mandrel configured to be at least partially received by the cavity of the sleeve. The mandrel comprises a first mandrel end disposed adjacent to the first sleeve end and comprising an enlarged portion having a diameter greater than a diameter of the cavity, a second mandrel end comprising a pull region, and a shank region extending intermediate the first mandrel end and the second mandrel end. The pull region comprises an axial length no greater than 4 times a diameter of the shank region and is configured to be engaged by an installation tool.
2. The blind fastener of clause 1, wherein the pull region comprises an axial length no greater than 3.8 times the diameter of the shank region.
3. The blind fastener of any one of clauses 1-2, wherein the pull region comprises an axial length no greater than 2 times the diameter of the shank region.
4. The blind fastener of any one of clauses 1-3, wherein the pull region comprises a taper extending from the shank region.
5. The blind fastener of any one of clauses 1-4, wherein the mandrel does not comprise a breakneck groove.
6. The blind fastener of any one of clauses 1-5, wherein the mandrel comprises a Rockwell hardness of at least HRC 25.
7. The blind fastener of any one of clauses 1-6, wherein the mandrel comprises a Rockwell hardness of at least HRC 43.
8. The blind fastener of any one of clauses 1-7, wherein the shank region comprises at least one of a threaded region, an annular shoulder, and a groove.
9. The blind fastener of any one of clauses 1-8, wherein the pull region comprises at least one of a threaded region, an annular shoulder, and a groove.
10. The blind fastener of any one of clauses 1-9, wherein the sleeve is generally cylindrical and the mandrel is generally cylindrical.
11. The blind fastener of any one of clauses 1-10, wherein the blind fastener comprises at least one of a metal, metal alloy, and a composite material.
12. The blind fastener of any one of clauses 1-11, wherein the blind fastener is adapted to be installed in a bore in a structure, the bore having a diameter greater than the diameter of the enlarged portion.
13. The blind fastener of clause 12, wherein the sleeve further comprises a collar, the sleeve is configured to deform on a first side of the structure, and the collar is configured to swage onto the shank region on an oppositely disposed second side of the structure.
14. The blind fastener of any one of clauses 12-13, wherein the structure comprises at least one of a metal, a metal alloy, and a composite material.
15. The blind fastener of any one of clauses 12-14, wherein the structure is configured as at least one of an aerospace component, an automotive component, a transportation component, and a building and construction component.
16. A method for fastening comprising inserting a first mandrel end of a blind fastener into a bore in a structure. The blind fastener comprises: a sleeve comprising a first sleeve end, a second sleeve end, and a cavity extending from the first sleeve end to the second sleeve end; and a mandrel configured to be at least partially received by the cavity of the sleeve. The mandrel comprises a first mandrel end disposed adjacent to the first sleeve end and comprising an enlarged portion having a diameter greater than a diameter of the cavity, a second mandrel end comprising a pull region, and a shank region extending intermediate the first mandrel end and the second mandrel end. The pull region comprises an axial length no greater than 4 times a diameter of the shank region and is configured to be engaged by an installation tool. The method further includes: engaging a collet of the installation tool with the pull region of the blind fastener; after inserting the first mandrel end into a bore, forcibly contacting the second sleeve end of the blind fastener with an anvil of the installation tool and moving the pull region distal from the second sleeve end utilizing the collet of the installation tool; and deforming the sleeve on a first side of the structure, and swaging the second sleeve end onto the shank region on an oppositely disposed second side of the structure, thereby securing at least a portion of the blind fastener in the structure.
17. The method of clause 16, wherein the pull region comprises an axial length no greater than 2 times the diameter of the shank region.
18. The method of any one of clauses 16-17, wherein the pull region comprises a taper or reverse taper extending from the shank region.
19. The method of any one of clauses 16-18, wherein the mandrel does not comprise a breakneck groove.

20. The method of any one of clauses 16-19, wherein the blind fastener comprises at least one of a metal, a metal alloy, and a composite material.

One skilled in the art will recognize that the herein described fasteners, structures, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed, and not as more narrowly defined by particular illustrative aspects provided herein.

What is claimed is:

1. A blind fastener comprising:
   a sleeve comprising
      a first sleeve end,
      a second sleeve end,
      a cavity extending from the first sleeve end to the second sleeve end; and
   a mandrel configured to be at least partially received by the cavity of the sleeve, the mandrel comprising
      a first mandrel end disposed adjacent to the first sleeve end and comprising an enlarged portion having a diameter greater than a diameter of the cavity,
      a second mandrel end comprising a pull region, and
      a shank region extending intermediate the first mandrel end and the second mandrel end,
      wherein the pull region comprises an axial length no greater than 4 times a diameter of the shank region and is configured to be engaged by an installation tool.

2. The blind fastener of claim 1, wherein the pull region comprises an axial length no greater than 3.8 times the diameter of the shank region.

3. The blind fastener of claim 1, wherein the pull region comprises an axial length no greater than 2 times the diameter of the shank region.

4. The blind fastener of claim 1, wherein the pull region comprises a taper extending from the shank region.

5. The blind fastener of claim 1, wherein the mandrel does not comprise a breakneck groove.

6. The blind fastener of claim 1, wherein the mandrel comprises a Rockwell hardness of at least HRC 25.

7. The blind fastener of claim 1, wherein the mandrel comprises a Rockwell hardness of at least HRC 43.

8. The blind fastener of claim 1, wherein the shank region comprises at least one of, a threaded region, an annular shoulder, and a groove.

9. The blind fastener of claim 1, wherein the pull region comprises at least one of a threaded region, an annular shoulder, and a groove.

10. The blind fastener of claim 1, wherein the sleeve is generally cylindrical and the mandrel is generally cylindrical.

11. The blind fastener of claim 1, wherein the blind fastener comprises at least one of a metal, metal alloy, and a composite material.

12. The blind fastener of claim 1, wherein the blind fastener is adapted to be installed in a bore in a structure, the bore having a diameter greater than the diameter of the enlarged portion.

13. The blind fastener of claim 12, wherein the sleeve further comprises a collar, the sleeve is configured to deform on a first side of the structure, and the collar is configured to swage onto the shank region on an oppositely disposed second side of the structure.

14. The blind fastener of claim 12, wherein the structure comprises at least one of a metal, a metal alloy, and a composite material.

15. The blind fastener of claim 12, wherein the structure is configured as at least one of an aerospace component, an automotive component, a transportation component, and a building and construction component.

16. A method for fastening, the method comprising:
   inserting a first mandrel end of a blind fastener into a bore in a structure, the blind fastener comprising
      a sleeve comprising
         a first sleeve end,
         a second sleeve end, and
         a cavity extending from the first sleeve end to the second sleeve end, and
      a mandrel configured to be at least partially received by the cavity of the sleeve, the mandrel comprising
         a first mandrel end disposed adjacent to the first sleeve end and comprising an enlarged portion having a diameter greater than a diameter of the cavity,
         a second mandrel end comprising a pull region, and
         a shank region extending intermediate the first mandrel end and the second mandrel end,
         wherein the pull region comprises an axial length no greater than 4 times a diameter of the shank region and is configured to be engaged by an installation tool;
   engaging a collet of the installation tool with the pull region of the blind fastener;
   after the inserting, forcibly contacting the second sleeve end of the blind fastener with an anvil of the installation tool and moving the pull region distal from the second sleeve end utilizing the collet of the installation tool; and
   deforming the sleeve on a first side of the structure, and swaging the second sleeve end onto the shank region on an oppositely disposed second side of the structure, thereby securing at least a portion of the blind fastener in the structure.

17. The method of claim 16, wherein the pull region comprises an axial length no greater than 3.8 times the diameter of the shank region.

18. The method of claim 16, wherein the pull region comprises a taper or reverse taper extending from the shank region.

19. The method of claim 16, wherein the mandrel does not comprise a breakneck groove.

20. The method of claim 16, wherein the blind fastener comprises at least one of a metal, a metal alloy, and a composite material.

* * * * *